United States Patent
Cavazos Sepulveda

(10) Patent No.: US 12,221,869 B1
(45) Date of Patent: Feb. 11, 2025

(54) METHOD FOR SUBSURFACE HYDROGEN STORAGE USING LIQUID ORGANIC HYDROGEN CARRIERS

(71) Applicant: SAUDI ARABIAN OIL COMPANY, Dhahran (SA)

(72) Inventor: Adrian Cesar Cavazos Sepulveda, Nuevo Leon (MX)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/459,108

(22) Filed: Aug. 31, 2023

(51) Int. Cl.
*E21B 43/16* (2006.01)
*C01B 3/00* (2006.01)
*E21B 43/38* (2006.01)

(52) U.S. Cl.
CPC .......... *E21B 43/168* (2013.01); *C01B 3/0015* (2013.01); *E21B 43/38* (2013.01)

(58) Field of Classification Search
CPC ...... E21B 43/168; E21B 43/38; C01B 3/0015
See application file for complete search history.

(56) References Cited

U.S. PATENT DOCUMENTS

| | | | |
|---|---|---|---|
| 4,626,131 A | 12/1986 | Glew et al. | |
| 2023/0257202 A1* | 8/2023 | Al-Qasim | F17C 1/007 405/53 |
| 2024/0240539 A1* | 7/2024 | Okuno | C09K 8/74 |

FOREIGN PATENT DOCUMENTS

| | | | |
|---|---|---|---|
| CN | 210133005 U | 3/2020 | |
| WO | 2022232630 A1 | 11/2022 | |
| WO | WO-2023012670 A1 * | 2/2023 | ............. E21B 43/00 |
| WO | WO-2023049668 A1 * | 3/2023 | ............. B65G 5/00 |

OTHER PUBLICATIONS

Abdin et al., "Large-Scale Stationary Hydrogen Storage Via Liquid Organic Hydrogen Carriers," iScience 24, 102966, Sep. 24, 2021, 23 pages.
Andersson et al., "Large-scale storage of hydrogen", International Journal of Hydrogen Energy, ScienceDirect, Mar. 29, 2019, vol. 44, pp. 11901-11919, 19 pages.
(Continued)

*Primary Examiner* — Kyle Armstrong
(74) *Attorney, Agent, or Firm* — Osha Bergman Watanabe & Burton LLP

(57) ABSTRACT

A method for subsurface hydrogen storage and hydrogen retrieval. The method includes identifying a subsurface formation, wherein the subsurface formation is selected from one or more of a depleted wet reservoir, depleted dry reservoir, salt cavern, excavated cavern, natural formation, isolated aquifer, or a reservoir designated as a contingency or marginal field. The method further includes selecting a liquid organic hydrogen carrier (LOHC) feed compatible with the subsurface formation. The LOHC feed includes a mixture of one or more completely or partially hydrogenated LOHCs. The LOHC feed is injected into the subsurface formation for storage. Later, when needed, the LOHCs are recovered from storage, optionally separating a recovered water/brine phase and off gas from the LOHCs from storage in a separator configured to produce a stream of recovered LOHCs. The LOHC is then dehydrogenated to form a H2 product and dehydrogenated LOHCs in a dehydrogenation unit process.

17 Claims, 3 Drawing Sheets

(56) References Cited

OTHER PUBLICATIONS

Sekine et al., "Recent Trends on the Dehydrogenation Catalysis of Liquid Organic Hydrogen Carrier (LOHC): A Review", Topics in Catalysis, May 27, 2021, vol. 64, pp. 470-480, 11 pages.
Török et al., "Ring transformations by heterogeneous catalysis," Advances in Green and Sustainable Chemistry 2022, pp. 491-542, 52 pages.
Verevkin et al., "Energetics of LOHC: Structure-Property Relationships from Network of Thermochemical Experiments and in Silico Methods", Hydrogen, Feb. 9, 2021, vol. 2, pp. 101-121, 21 pages.
S. Zavareh and E. Norouzi, "Impregnation of GO with Cu2+ for enhancement of aniline adsorption and antibacterial activity," Journal of Water Process Engineering, Oct. 26, 2017, pp. 160-167, 8 pages.
International Search Report issued for corresponding international patent application No. PCT/US2024/043328, mailed Nov. 29, 2024 (6 pages).
Written Opinion issued for corresponding international patent application No. PCT/US2024/043328, mailed Nov. 29, 2024 (7 pages).
Reuß, M. et al., "Seasonal storage and alternative carriers: A flexible hydrogen supply chain model," Applied Energy, 2017 (13 pages).

* cited by examiner

METHOD FOR SUBSURFACE HYDROGEN STORAGE USING LIQUID ORGANIC HYDROGEN CARRIERS

BACKGROUND

Grid intermittency is an issue for renewable energy sources which has motivated global efforts to advance the storage and transportation of decarbonized fuels at larger scales. Hydrogen is seen as a viable alternative to fossil fuels because the product of combustion is water, which is not a greenhouse gas. However, hydrogen has a low volumetric energy density and compression is energy intensive, which makes storage and transportation in the existing infrastructure for power plants and transportation fuels infeasible. Current research is looking into alternate methods of storage and transportation to create more volumetrically scalable approaches than handling compressed hydrogen in aboveground facilities.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for subsurface hydrogen storage and hydrogen retrieval. The method includes identifying a subsurface formation, wherein the subsurface formation is selected from one or more of a depleted wet reservoir, depleted dry reservoir, salt cavern, excavated cavern, natural formation, isolated aquifer, or a reservoir designated as a contingency or marginal field. The method further includes selecting a liquid organic hydrogen carrier (LOHC) feed compatible with the subsurface formation. The LOHC feed includes a mixture of one or more completely or partially hydrogenated LOHCs. The LOHC feed is injected into the subsurface formation for storage. Later, when needed, the LOHCs are recovered from storage, optionally separating a recovered water/brine phase and off gas from the LOHCs from storage in a separator configured to produce a stream of recovered LOHCs. The LOHC is then dehydrogenated to form a $H_2$ product and dehydrogenated LOHCs in a dehydrogenation unit process.

In another aspect, embodiments disclosed herein relate to a method for subsurface hydrogen storage and hydrogen retrieval and enhanced oil recovery using liquid organic hydrogen carriers (LOHCs). The method includes identifying a subsurface formation, wherein the subsurface formation selected from one or more reservoir designated as an unconventional, contingency or marginal field. A LOHC feed is selected that is compatible the subsurface formation and compatible with surfactants, additives, or both, for enhanced oil recovery. The LOHC feed is injected for storage in the subsurface formation, wherein the LOHC feed includes a mixture of one or more completely or partially hydrogenated LOHCs. Later, when the hydrogen is needed, a mixture of oil/gas and LOHCs is recovered from the subsurface formation, wherein injection of water/brine to flood the subsurface formation is used for recovery of the mixture of oil/gas and LOHCs from storage. The recovered water/brine, off gas and LOHCs from the subsurface formation are then separated, using a separator to produce a stream of recovered LOHCs. Contaminants and produced oil and gas are then removed from recovered LOHCs in one or more refining process, and an $H_2$ product is produced by dehydrogenating LOHCs in a dehydrogenation unit.

Other aspects and advantages of the claimed subject matter will be apparent from the following description and the appended claims.

DETAILED DESCRIPTION

Figure 1:
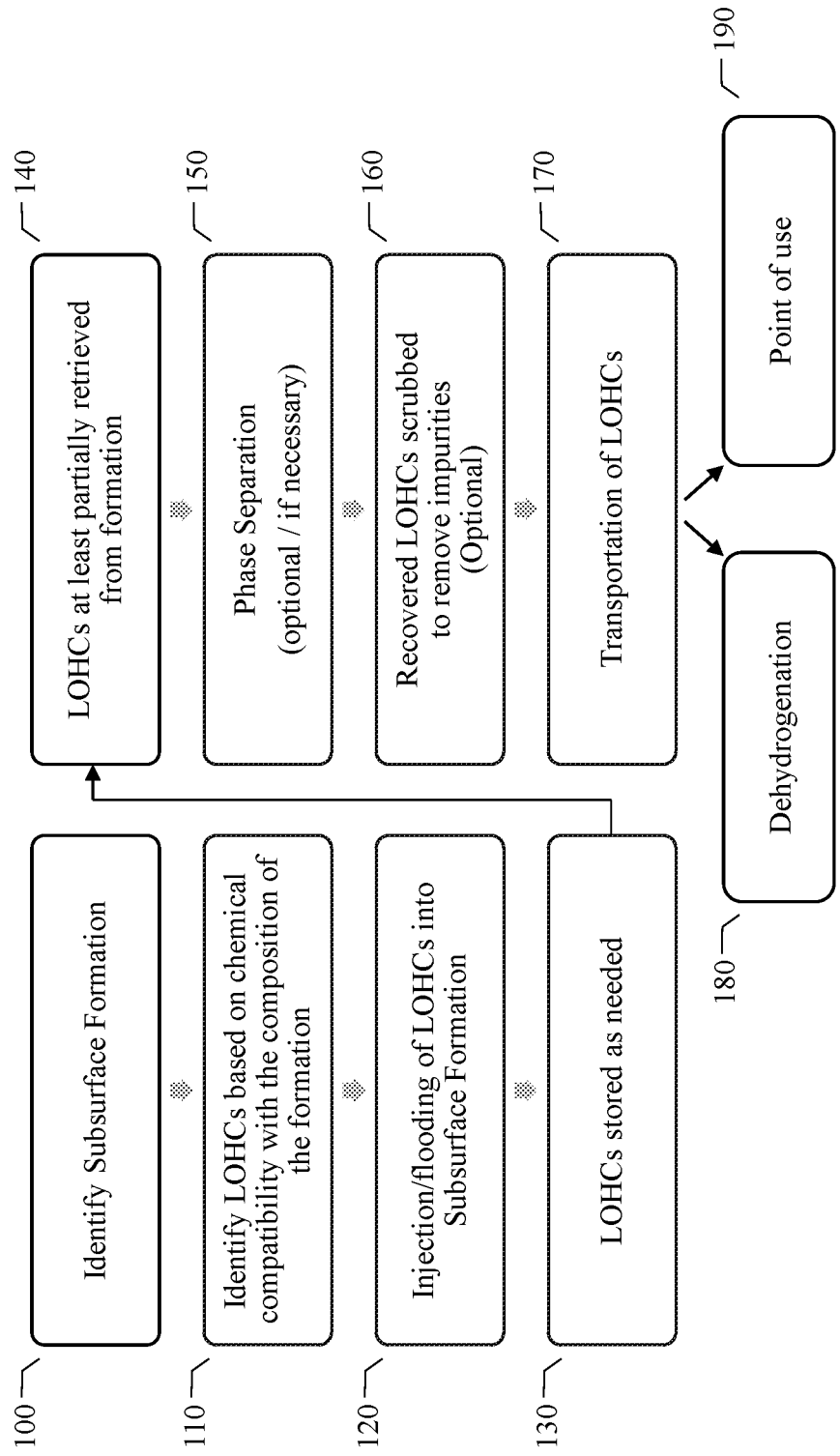
FIG. 1 is a flow chart illustrating a method of subsurface LOHC hydrogen storage according to embodiments herein.

Embodiments disclosed herein relate to subsurface storage of hydrogen using liquid organic hydrogen carriers. Storage of hydrogen is complex due to the extremely low temperatures (−240° C.) required for liquefication. The pressures required to store compressed hydrogen can be achieved in high-pressure wells, although it would be impractical because of the cost of compression and high losses involved. As an alternative, it is envisioned to store hydrogen using liquid organic hydrogen carriers at large scale in subsurface formations. Storing LOHCs in a reservoir is less energy intensive and offers a more volumetrically scalable approach than handling compressed hydrogen in aboveground facilities.

The LOHCs considered for subsurface storage are composed primarily of hydrocarbons that can be found in petroleum and refinery processes. The hydrocarbons identified for use as LOHCs include, but are not limited to, linear olefins, aromatic, heteroatomic and heteroaromatic compounds. These LOHCs include hydrocarbons that remain in the liquid phase during transportation and storage, and exhibit compatibility with subsurface formations. For example, the LOHCs may include C5+ hydrocarbons, including cyclic C5+ or aromatic C6+ hydrocarbons, including those having a heteroatom in the ring(s). Hydrogen stored using LOHCs in a liquid phase contain energy densities comparable with that of compressed hydrogen. In contrast to compressed hydrogen in storage tanks, maintaining LOHCs stored in subsurface formations does not require additional energy input until retrieval from the reservoir.

Reservoirs that are partially or completely depleted from hydrocarbons are attractive because they are well characterized and there is the potential to coordinate LOHC storage with enhanced oil recovery. Due to their low solubility in water and low density, LOHCs can be retrieved with conventional water/seawater flooding. LOHCs useful in embodiments herein have a specific gravity of less than 1 g/cm³ and may have a density less than water at conditions to be used within a reservoir. Additionally, LOHCs useful in embodiments herein have a solubility of less than 10 g/L, such as less than 1 g/L, less than 0.1 g/L, or less than 0.01 g/L, less than 1 mg/L, or less than 0.1 mg/L, as measured at 20° C. Hydrocarbons found in crude oil and refinery streams including heavier molecules, such as benzyltoluene and dibenzyletoluene, are excellent candidates for use in LOHC storage. Benzyltoluene is one example that exhibits a low solubility in water of 38 μg/L at 20° C. and low density of 0.995 g/cm³. In addition, the intended LOHCs can serve as petroleum crude solvents for enhanced oil recovery. Other available compounds identified for use as LOHCs include linear as well as cyclic forms of hydrocarbons (whether single or multiple rings) comprised not only of carbon rings but also heteroaromatic rings, such as with inclusion of heteroatoms, including nitrogen, sulfur, boron, phosphorous, oxygen, and/or mixtures thereof. Such LOHCs included, but are not limited to, N-ethylcarbazole, thiophenes, phosphorines, thiaborolid and selenium containing selenophenes.

LOHCs are olefins or aromatic compounds with unsaturated carbon-carbon bonds. Toluene is an example of an aromatic LOHC that is easily hydrogenated to form methylcyclohexane. Hydrogenation is commonly practiced in refineries and chemical processes using high pressure hydrogen with a supported Ni or noble-metal catalyst. The reactor is operated at 100 to 250° C. with hydrogen pressures ranging 10 to 60 bar. Toluene has three double bonds that can accept three $H_2$ molecules to form methylcyclohexane. For reference, each molecule of toluene in its hydrogenated form, methylcyclohexane, carries three hydrogen atoms that can be stored and later recovered.

Following recovery, a reversible dehydrogenation process releases the hydrogen from LOHCs for use in its molecular form, as $H_2$. Dehydrogenation is routinely practiced at high temperatures to produce $H_2$, aromatics and olefins in petroleum refining and chemical processes. The dehydrogenation processes typically use noble-metal catalysts and operate in the range of 350 to 600° C. at pressures up to 40 bar. This reversible hydrogenation and dehydrogenation process can be considered cyclic as it allows reuse of the LOHCs for storage and recovery of $H_2$.

LOHCs can be handled safely with existing infrastructure for transportation with ship, barge, rail, truck, pipeline, and storage terminals. This allows for transport of hydrogen from a storage site to centralized locations for dehydrogenation and use, with similar logistics used for transportation and storage of oil and gas. For example, large quantities of LOHCs can be transported from remote oil fields via ship or pipeline to dehydrogenation facilities near power plants or fueling stations. Dehydrogenated LOHCs may then be shipped back to a plant where hydrogen is produced, hydrogenated, and injected into a subsurface storage facility.

An embodiment of this disclosure involves using underground reservoirs deemed impractical for oil and gas production, or hydrogen storage, due to biological activity. Hydrogen and hydrocarbons are subject to biotic processes where microbes metabolize hydrogen through degradation mechanisms such as methanogenesis or sulfur reduction processes. Molecular $H_2$ is thermodynamically less stable than $H_2S$, with Gibbs Free Energies of 0 KJ/mol for $H_2$ and −33 KJ/mol for $H_2S$. Therefore, molecular hydrogen is more prone to degradation mechanisms than $H_2S$. LOHCs such as biphenyl, benzyltoluenes, dibenzyltoluenes, trimethylpryazine, tetramethylpryazine, dimethylpyrazine, triazine, aniline, N-methyl-aniline, N,N-dimethyl-aniline, to name a few, have Gibbs free energies between −35 KJ/mol and −75 KJ/mol so they are more stable. Other hydrogen carriers such as diphenylamine, triphenylamine have Gibbs free energies below −150 KJ/mol. Therefore, it is not thermodynamically favorable for bacteria to convert most LOHCs to $H_2S$. Furthermore, biological pathways to consume these LOHCs are not as common as those of nitrifying bacteria, i.e., methanogenesis. In addition, LOHCs such as pyrazines and aniline have antibacterial properties which could disrupt biological $H_2$ or LOHC degradation properties. Hence, mixing selected LOHC components in feed mixtures for biotic control is proposed when biological degradation is expected in a given subsurface formation.

FIG. 1 summarizes the basic steps for storage and retrieval of hydrogen using LOHCs, beginning with the identification of a suitable subsurface formation (step 100). One or more LOHCs are selected (step 110) based on their chemical compatibility with the composition of a reservoir. A mixture of hydrogenated and/or partially hydrogenated LOHCs can then be injected (step 120) and stored (step 130) in the subsurface formation until retrieval is needed (step 140). After retrieval, LOHCs are optionally sent to a separator to remove any aqueous and gaseous phases produced with the LOHCs from the storage formation (step 150). The LOHCs may be scrubbed, for example, with water, caustic or another solvent, to remove additional contaminants as necessary (step 160). Transportation of LOHCs can be accomplished through one or more steps depending on the location of the storage facilities and destination, including pipeline, ship, barge, rail, or truck (step 170). The recovered LOHCs can be sent directly to a dehydrogenation unit or transported to the point of use (steps 180 and 190).

Referring back to step 100, a suitable subsurface formation for LOHC storage may be selected from one or more of a depleted wet reservoir, depleted dry reservoir, salt cavern, natural formation, isolated aquifer, or excavated cavern. Reservoirs designated as contingent or marginal fields are generally compatible with LOHC storage because hydrocarbons were previously stored in the same subsurface formations. Furthermore, LOHC storage may be used for enhanced oil and gas recovery for conventional or unconventional reservoirs because they can serve as a petroleum crude solvent.

Several factors should be considered in the selection of a subsurface formation, including potential contaminants, geology, and location (step 100). Even if a reservoir is considered depleted, it may still contain significant impurities that make it impractical. For example, high levels of $H_2S$ and $CO_2$ associated with water/brine may require costly removal and cleanup. Significant biological activity may create a corrosive environment for production pipes and equipment. In addition, the structure of the formation should still be amendable to storage and recovery of water/brine and storage without significant losses of LOHCs.

Other factors may also be considered when selecting a formation. For example, characteristics of an acceptable storage formation related to geological characteristics, biological activity, chemistry, proximity to shipping facilities, and other economic factors may be considered. Other factors to consider may also include wettability of the subsurface formation (water wet, oil wet, mixed wettability), solubility of formation materials in the LOHC, degradability of LOHCs by extremophiles (microbes in the formation), factor of recovery, depth of formation, pumping energy overhead, and produced fluid composition, tolerable pressure ranges of the formation as well as the formation storage volume and temperature.

Liquid hydrocarbons, such as natural gas liquids, are routinely stored in excavated caverns and salt caverns. Refineries also use such caverns for temporary storage of various hydrocarbon streams when adequate volume is not available in aboveground storage. A cavern is a region in a formation that has been hollowed out, either by mining methods, or by dissolution of salts in a salt formation with water. Water/brine exists naturally in the caverns, especially if located near an aquifer. It should be noted that "water/brine" shall be used herein to refer to any mixture of water, brine and/or connate recovered from or injected into a storage subsurface structure. The compounds selected for use as LOHCs are less dense and immiscible with water/ brine. Therefore, the LOHCs, and any crude oil and natural gas liquids present, will form a layer on top of the water/brine. LOHCs may be injected and recovered from caverns directly using pumps. However, extraction is often assisted by injecting water/brine into bottom of the cavern, which acts to displace and lift LOHCs towards the surface.

The storage of LOHCs in depleted oil and gas reservoirs is performed in a similar manner to caverns. However, oil and gas reservoirs differ from caverns in that the volume available for storage is made up of the pore space in the rock that makes up the formation, instead of open chambers or caves. The depleted reservoirs are located under a cap rock that prevents hydrocarbons, including LOHCs, from migrating out of the storage formation. Maintaining a minimum level of water/brine below the cap rock provides a barrier to the migration of hydrocarbons into a lower formation. The formation could be pressurized with the LOHCs and that pressure could later be used to retrieve the stored LOHCs. Alternatively, water/brine may be pumped into the formation to displace LOHCs from the pore space, as they are pumped out of storage.

Storage formations should have access to process facilities, such as a gas plant or petroleum refinery. LOHCs recovered from subsurface storage require a phase separation unit, or separator, to remove aqueous phases that fall out upon cooling, and off gas released as pressure is decreased (step 150). LOHCs stored in depleted reservoirs may also require treatment in a scrubber to remove acidic contaminants, such as $CO_2$ and $H_2S$ (step 160). The economics of a storage site improves significantly when existing facilities and utilities are available.

In step 110, once a suitable formation is identified, the LOHC feed mixture is selected to ensure it is compatible with the composition and conditions of the subsurface formation. The LOHC feed mixture may comprise one or more naturally occurring hydrocarbons with a lower density than water/brine, and low solubility in water or brines, including linear hydrocarbons, naphthene, aromatic, heteroatomic and heteroaromatic compounds. It should be noted that "water/brine" shall be used herein to refer to any mixture of water and/or connate recovered from or injected into a storage reservoir associated with the storage and retrieval of LOHCs and/or as part of an enhanced oil recovery strategy. The LOHC feed may include compounds, such as pyrazines or aniline, that exhibit stability and antibacterial properties for disruption of biological degradation of $H_2$ and LOHCs. At least one LOHC component with antibacterial properties may be mixed into LOHC feed for biotic control if biological degradation is present in a given subsurface formation.

Figure 2:
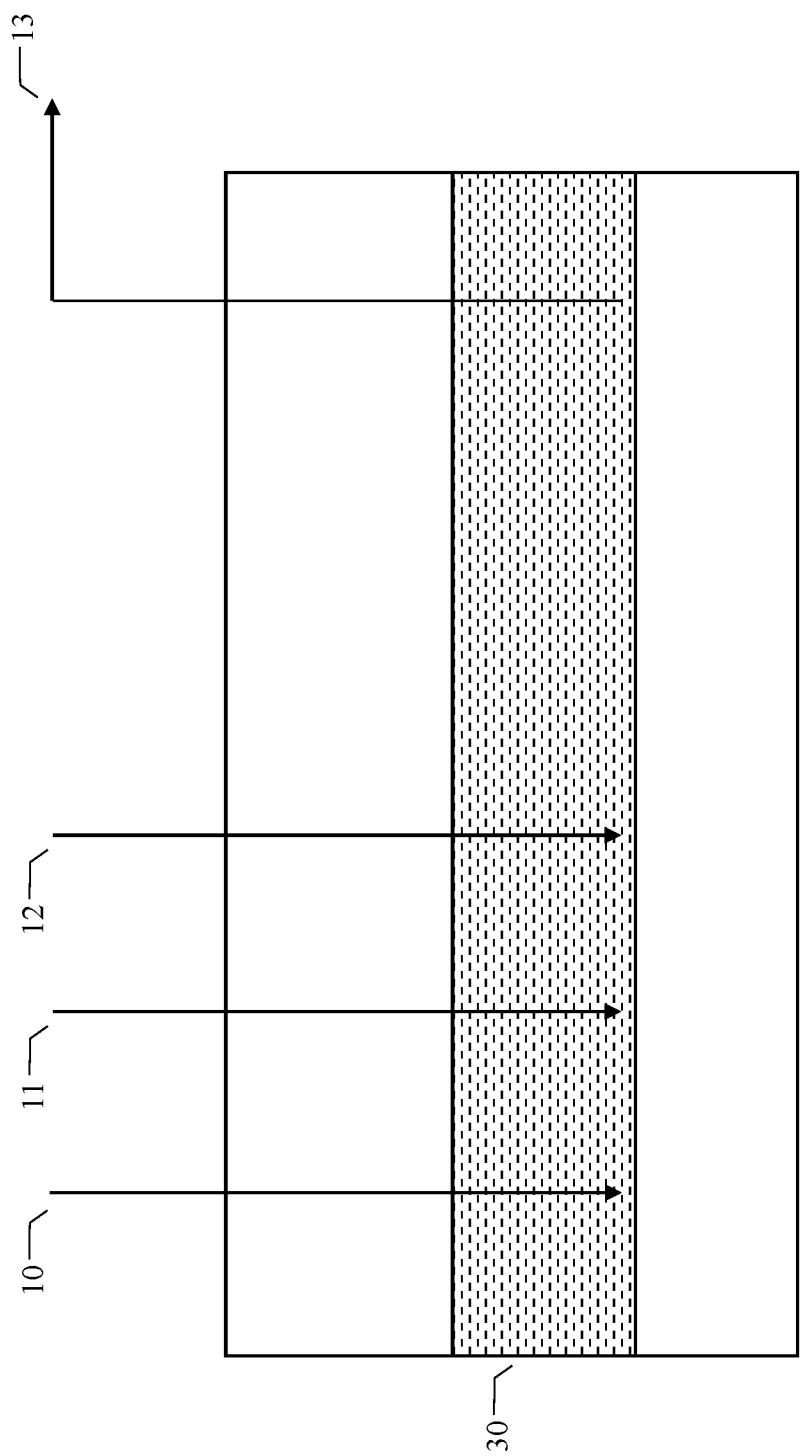
FIG. 2 is a simplified schematic of the subsurface storage and retrieval of LOHCs according to embodiments herein.

Injection (step 120, FIG. 1) and retrieval (step 150, FIG. 1) of LOHCs from storage [13] is accomplished through conventional methods for production of oil and stored petroleum products. As shown in FIG. 2, LOHC feed [10] is injected for storage in a subsurface formation [30]. LOHC feed [10] may include a mixture of one or more LOHCs that are fully or partially hydrogenated. At least one LOHC with antibacterial properties may be mixed into LOHC feed [10] for biotic control if biological degradation is expected in a given subsurface formation [30]. High pressure $H_2$ feed [12] may also be injected as a liquid or gas into a subsurface formation for storage before, in addition to LOHC feed [10].

As shown in (step 140), volumes of LOHCs can be at least partially retrieved from storage as needed to meet the demands of various end users (i.e., power plants, transportation fueling hubs, etc.). Subsurface storage [30] of LOHCs is considered temporary and to be managed in a similar manner as products in and out of a pipeline storage facility for petroleum products. Transportation (step 170) of recovered LOHCs [13] can also be shared with the same infrastructure and logistics used for distribution of petroleum and petrochemical products.

LOHCs may be pumped directly in and out of a cavern (steps 120 and 160). However, the volume of LOHCs in storage is often controlled with an adjustment of the level of the water/brine [11] in the cavern. For example, water/brine [11] may be pumped out of the subsurface formation [30] as LOHC feed [10] is injected. LOHCs are then extracted by pumping water/brine [11] into the cavern. LOHCs are less dense than the water/brine layer. Therefore, LOHCs from storage [13] are forced out of the cavern as the level of the water/brine [11] rises.

Injection and retrieval of LOHCs from storage [13] in a depleted reservoir is operated in a similar manner to caverns. A water/brine [11] level is maintained in a depleted reservoir to prevent the LOHC feed [11] from migrating out of the storage zone. Similarly, water/brine [11] is injected into depleted reservoirs to displace LOHC feed [10] from the pore space in the formation when LOHCs are retrieved. LOHC feed [10] is selected to be compatible with surfactants and additives used to improve the flow of LOHC feed [10] and water/brine [11] through the porous rock that makes up the storage zone in the subsurface formation [30]. Water/brine [11], natural gas, hydrogen gas, crude oil and other contaminants may be produced with LOHCs from storage [13] in depleted reservoirs, which may require additional post-treatment.

Figure 3:
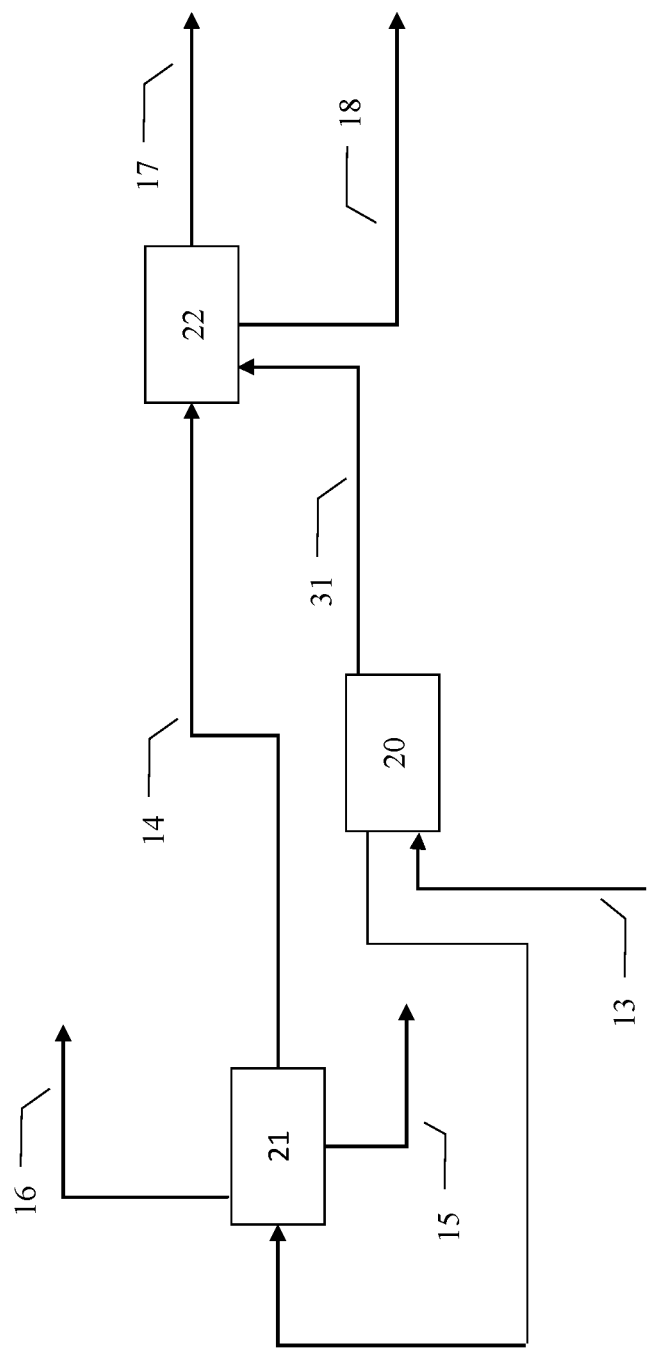
FIG. 3 is a simplified schematic of a LOHC and $H_2$ recovery process according to embodiments herein.

As shown in FIG. 3, a heat recovery process [20] is used to recover geothermal energy from LOHCs from storage [13] before they are sent to a separator [21]. A separator [21] is used to remove an aqueous phase, mainly composed of water/brine [15], and a gas phase, an off gas [16], from the recovered LOHCs [14]. Recovered LOHCs are then transported to a dehydrogenation unit [22]. There is a significant amount of experience in industry with the dehydrogenation of hydrocarbons that translates well for LOHCs. The $H_2$ product [17] can be sent directly to a power plant or fueling stations. Dehydrogenated LOHCs [18] are either sent directly to a hydrogenation unit [22] or to a refinery for further processing.

A system for heat recovery [20] also includes heat exchangers configured to generate steam [31] using the heat recovered from the LOHCs from storage [13]. Steam [31] may be generated through direct-contact steam generation or through heat integration with an operating unit. Steam is used to provide heat to process equipment and can be sent to a steam turbine to generate electricity. The thermal stability and heat transfer properties of the LOHC feed [10] is considered when intended for geothermal energy processes.

The LOHCs are then sent from the heat recovery [20] unit to a separator [21] system. The separators are horizontal vessels configured with internals to promote coalescence of water dispersed in the LOHCs. As the water coalesces to form larger droplets, the droplets settle to the bottom of the vessel to collect in a sump. A weir provides a barrier to prevent the aqueous phase, which is recovered water/brine [15], from passing to an outlet where the recovered LOHCs [14] are removed. A vent at the top of the vessel is configured to allow off gas [16] to be removed. In one or more embodiments a water-oil separator (WOSEP) can be used.

Recovered water/brine [15] is filtered to remove suspended solids and oils. Recovered water/brine [15] is then sent to a brine pond where solids, mainly salts, fall out of solution settle to the bottom. The water/brine is then treated with antiscalants, biocides, and corrosion inhibitors before reuse, to protect the well, subsurface formation [30], and related equipment.

The amount of treatment required for an off gas [16] depends on the location. Caverns tend to require cleanup of trace contaminants, such hydrocarbons that can be sent to a thermal oxidizer. However, contaminants from depleted reservoirs may include natural gas, $CO_2$ and $H_2S$ which require removal using conventional gas treating technologies, such as membranes, scrubbers and absorbers. Existing infrastructure at gas plants or refineries can often be used to for processing off gas [16].

If $H_2$ feed [12] is injected into the subsurface formation, then $H_2$ product [17] may also be recovered from the off gas [16]. The amount of purification for recovered $H_2$ depends on how the recovered $H_2$ will be used downstream. $H_2$ product [17] intended for fuel gas may tolerate a small amount of $CO_2$ or methane.

Recovered LOHCs [14] are sent to the dehydrogenation unit [22] to produce $H_2$ product [17] and dehydrogenated LOHCs [18]. LOHCs recovered from storage [13] may contain water/brine [11], light contaminants (e.g., $CO_2$, $H_2S$, and natural gas), natural gas liquids and crude oil. Therefore, the dehydrogenation process may include steps, not shown, to remove any remaining contaminants, such as water/brine and/or hydrocarbons prior to dehydrogenation. For example, water or caustic may be used in a scrubber to remove trace sulfur compounds or salt driers may be used to remove water. Alternatively, recovered LOHCs [14] may be sent to one or more downstream processes in a refinery to remove dissolved natural gas liquids or crude oil produced from the subsurface formation [30].

The dehydrogenation unit [22] performs dehydrogenation that is a reversible process that allows for recycle and reuse of the recovered LOHCs [14] as LOHC feed [10]. Improvements to hydrogenation and dehydrogenation [22] processes are possible, although commercially viable options are available. A key attribute of the reversible nature of the dehydrogenation [22] processes is that it is a circular process through which $CO_2$ is not emitted as a byproduct. Dehydrogenated LOHCs are then be hydrogenated and recycled as LOHC feed [10] in a subsurface formation.

Another advantage of the disclosed process is the ability to safely transport recovered LOHCs [14] in the hydrogenated form using existing transportation infrastructure, such as pipeline, ship, rail, and truck. Hydrogenated LOHCs can be shipped from storage in a subsurface formation [30] to centralized locations for dehydrogenation [22], with similar logistics used for fuels. For example, large quantities of LOHCs can be transported from storage in remote subsurface formations [30] via ship, barge, or pipeline to dehydrogenation [22] facilities near power plants. Dehydrogenated LOHCs may then be shipped back to a hydrogenation plant, not shown, to be saturated with hydrogen and reinjected into a subsurface formation [30] for long term storage.

Hydrogen storage with LOHCs in subsurface reservoirs is more energy efficient and volumetrically scalable than above-ground storage of compressed hydrogen. The LOHC fluids (single or multicomponent) are hydrocarbons found in crude oil and refinery streams. They are compatible with storage in subsurface formations based on the fact that hydrocarbons are produced in similar formations (e.g., light crude oil, extra-light crude oil or oil with high aromatic cuts). LOHCs also exhibit physical properties suitable for flooding of subsurface formations, including low density, low solubility in water, and low toxicity.

Embodiments of the present disclosure may provide at least one of the following advantages. A carbon-free method for method for subsurface storage of hydrogen using large volumes of LOHCs. A less energy intensive and volumetrically demanding method of for hydrogen storage in comparison to compressed gaseous hydrogen. LOHCs used for hydrogen storage are compatible with retrieval by flood with water/brine and can serve as a petroleum crude solvent for enhanced oil recovery. Many LOHCs can be employed as subsurface biotic control for applications associated with hydrogen consuming microorganisms. Hydrogen recovery from LOHCs using reversible dehydrogenation processes does not generate $CO_2$ as a byproduct, which increases efficiency and reduces carbon footprint. In addition, geothermal energy recovered from subsurface formations with LOHCs can be used to produce power, further offsetting the carbon intensity of the overall process.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for subsurface hydrogen storage and hydrogen retrieval, the method comprising:
    identifying a subsurface formation, wherein the subsurface formation is selected from one or more of a depleted wet reservoir, depleted dry reservoir, salt cavern, excavated cavern, natural formation, isolated aquifer, or a reservoir designated as a contingency or marginal field;
    selecting LOHC feed compatible with the subsurface formation; wherein the LOHC feed includes a mixture of one or more completely or partially hydrogenated LOHCs;
    injecting the LOHC feed in the subsurface formation for storage;
    recovering LOHCs from storage;
    separating a recovered water/brine phase and off gas from the LOHCs from storage in a separator configured to produce a stream of recovered LOHCs; and
    producing $H_2$ product and dehydrogenated LOHCs in a dehydrogenation unit process.

2. The method of claim 1, wherein the LOHC feed comprises one or more of linear olefins, naphthene, aromatic, heteroatom, and heteroaromatic compounds.

3. The method of claim 1, further comprising:
    transporting recovered LOHCs to a dehydrogenation unit near a point of use;
    wherein the recovered LOHCs are transported by existing infrastructure, such as pipeline, rail, truck, or ship.

4. The method of claim 1, further comprising:
    hydrogenating dehydrogenated LOHCs for reinjection into a subsurface formation for hydrogen storage.

5. The method of claim 1, further comprising:
    selecting at least one component of the LOHC feed that is identified for a subsurface biotic control.

6. The method of claim 1, further comprising:
    injecting $H_2$ under pressure, as a gas or liquid, into the subsurface formation; and
    separating $H_2$ from the off gas of the separator to produce an $H_2$ product.

7. The method of claim 1, further comprising:
    transferring LOHCs from storage to a heat recovery unit to recover geothermal energy for producing steam, and generating power using the steam.

8. The method of claim 1, further comprising removing contaminants from the recovered water/brine and off gas in one or more downstream processes.

9. A method for subsurface hydrogen storage and hydrogen retrieval and enhanced oil recovery using liquid organic hydrogen carriers (LOHCs), the method comprising:
  identifying a subsurface formation, wherein the subsurface formation selected from one or more reservoir designated as an unconventional, contingency or marginal field;
  selecting an LOHC feed compatible the subsurface formation and compatible with surfactants, additives, or both, for enhanced oil recovery;
  injecting the LOHC feed for storage in the subsurface formation, wherein the LOHC feed include a mixture of one or more completely or partially hydrogenated LOHCs;
  recovering a mixture of oil/gas and LOHCs from the subsurface formation, wherein injection of water/brine to flood the subsurface formation is used for recovery of the mixture of oil/gas and LOHCs from storage;
  separating recovered water/brine, off gas and LOHCs from the subsurface formation, using a separator to produce a stream of recovered LOHCs;
  removing contaminants and produced oil and gas from recovered LOHCs in one or more refining process; and
  producing an $H_2$ product and dehydrogenated LOHCs in a dehydrogenation unit.

10. The method of claim 9, wherein the LOHC feed comprises one or more of linear hydrocarbons, naphthene, aromatic, heteroatomic, and heteroaromatic compounds.

11. The method of claim 9,
  wherein the recovered LOHCs includes a mixture of produced oil and natural gas;
  and the method further comprises:
  refining the off gas in one or more downstream processes to remove contaminants from the mixture.

12. The method of claim 9, further comprising:
  processing recovered water/brine to remove contaminants in one or more downstream processes; wherein the recovered water/brine is reused in the recovery of LOHCs from the subsurface formation.

13. The method of claim 9, further comprising:
  selecting one or more LOHC feed compatible surfactants and additives mixed with water/brine for enhanced oil recovery; and
  injecting the mixture of water/brine and surfactant and additives to flood the subsurface formation for oil recovery; wherein the recovered oil is sent to a refinery or a dehydrogenation unit.

14. The method of claim 9, further comprising:
  hydrogenating dehydrogenated LOHCs for reinjection into the subsurface formation for hydrogen storage.

15. The method of claim 9, further comprising:
  selecting at least one LOHC of the LOHC feed that is identified for a subsurface biotic control.

16. The method of claim 9, further comprising:
  injecting $H_2$ under pressure, as a gas or liquid, into the subsurface formation; and
  separating $H_2$ from the off gas of the separator to produce an $H_2$ product.

17. The method of claim 9, further comprising:
  transferring LOHCs from the subsurface formation to a heat recovery unit to recover geothermal energy;
  producing steam; and
  generating power using the steam.

* * * * *